June 6, 1939.  F. E. LOUGHNER ET AL  2,161,626
LOCKING DEVICE
Filed Sept. 25, 1937
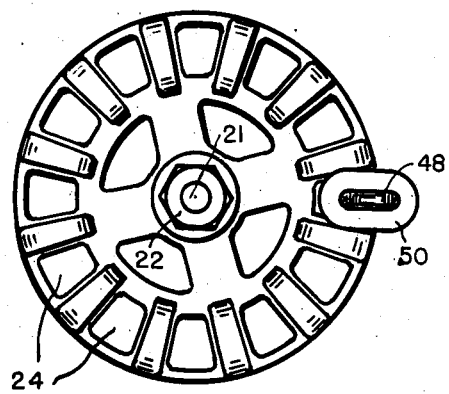
Fig. 2
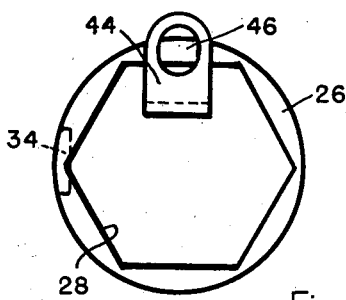
Fig. 4
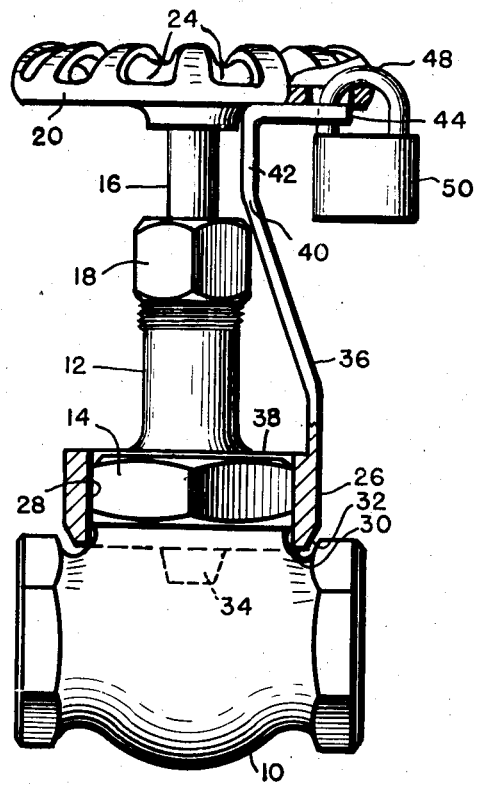
Fig. 1
Fig. 3
INVENTORS
Frank Loughner &
French H. Morehead
BY
Albert J. Henderson
ATTORNEY.

Patented June 6, 1939

2,161,626

UNITED STATES PATENT OFFICE 2,161,626

LOCKING DEVICE

Frank E. Loughner, Greensburg, Pa., and French H. Morehead, Riverside, Conn., assignors to Walworth Patents Inc., Boston, Mass., a corporation of Massachusetts Application September 25, 1937, Serial No. 165,694

5 Claims. (Cl. 70—180)

This invention relates to locking devices and more particularly to locking devices for the handwheels of valves and the like.

One object of the invention is to prevent unauthorized rotation of the handwheel to open or close the valve.

Another object of the invention is to permit the handwheel to be locked in any desired position.

Another object of the invention is to permit authorized opening or closing of the valve without removal of the device therefrom.

Another object of the invention is to provide a device which will be applicable to existing structures without any alteration thereof.

Another object of the invention is to construct the device so that an ordinary padlock may be used to secure the handwheel against rotation.

Another object of the invention is to render the device simple in form and inexpensive, so that large numbers of valves may be permanently equipped without materially adding to the cost of the installation.

Other objects and advantages will become apparent from the following description taken in connection with the accompanying drawing wherein:

Fig. 1 is a front elevation of a valve showing the device applied thereto and being shown partly in section.

Fig. 2 is a plan view of the same.

Fig. 3 is an elevational view of the locking device separated from the valve, and Fig. 4 is a plan view of the same.

Referring more particularly to the drawing the locking device for illustrative purposes is shown in Fig. 1 as being applied to a conventional globe valve. The valve comprises a casing 10 having a bonnet 12 provided with an enlarged polygonal base 14 threadedly engaging the casing 10. The base 14 may be integral with the bonnet 12 or may consist of a separable union ring, both constructions being common in the art. The stem 16 of the valve projects through the end of the bonnet 12, which is provided with a packing gland 18 for the stem in the usual manner.

The valve stem 16 may be rotated by a handwheel 20 secured to the projecting end 21 as by means of the nut 22. The handwheel 20 is of the conventional non-heating type having a plurality of rectangular perforations 24 annularly disposed in the surface thereof. When the handwheel 20 is rotated to open and close the valve an appreciable axial movement of the stem takes place. Hence, the distance between the handwheel and any portion of the casing 10 is considerably greater in the open position of the valve than in the closed position thereof.

The locking device of this invention is designed to prevent unauthorized rotation of the handwheel 20 to operate the valve either from the closed or open position and, to this end, means are provided to connect the handwheel to the casing in either of these positions. Accordingly, the locking device comprises an annular member 26 having a polygonal bore 28 adapted to slidably engage the polygonal base 14 and thus be prevented from rotation relative thereto. The annular member 26 preferably extends beyond the base 14 so that one end face 30 of this member may seat upon the casing 10. Preferably, the outer periphery of the annular member adjacent the end face 30 is provided with a chamfer 32 to insure seating of the end face 30 on the casing 10, as described.

In order to prevent the annular member 26 from being rotated as a unit with the base 14 relative to the casing 10, the member is provided with a lug 34 depending from the end face 30. This lug 34 may normally be clear of contact with the casing 10 but would be brought into contact therewith and act as a stop upon rotation of the annular member 26 and base 14, as will be apparent.

The annular member 26 is further provided with an arm denoted generally by reference numeral 36, projecting from the opposite end face 38 thereof. The arm extends toward the handwheel 20 and is deflected inwardly from the side of the annular member 26 toward the valve stem 16 and has a portion 40 extending into overlying relationship with the packing gland 18. The arm then has a portion 42 extending substantially parallel with the stem 16 and terminating in a reversely deflected portion 44 substantially perpendicular to the portion 42. The arm 36 is of such length that the reversely deflected portion 44 extends in proximate relation with the underside of the handwheel 20 and substantially parallel thereto when the annular member 26 is seated on the casing 10, as shown in Fig. 1. This position of the annular member 26 and the arm 36 is such as would be assumed thereby when the valve is in closed position. The deflected portion 44 is provided with a perforation 46 through which the shackle 48 of a padlock 50 may extend.

It will be apparent that the locking device described may be quickly and economically made by casting, in which case no machining will be required. The slidable relation between the annular member 26 and the base 14 does not require any accuracy of manufacture and the polygonal bore 28 may be left rough and loosely fitting. Other methods of manufacture may, of course, be adopted in view of the simplicity of the device requiring no special precision in manufacture.

When the device is to be applied to a valve the handwheel 20 is first detached by removing the nut 22 or other means which secures it in position. The annular member 26 may then be slipped over the polygonal base 14 and the handwheel and nut replaced. When the valve is in closed position the handwheel will be at its shortest distance from the casing 10, as described, and the underside of the handwheel will be in proximate relation with the deflected portion 44 of the arm. The perforation 46 in the deflected portion 44 will co-mate with one of the perforations 24 in the handwheel. If such co-mating of the perforations does not occur the handwheel may be rotated in the opening direction to cause one of the perforations 24 therein to co-mate with the perforation 26. Such movement of the handwheel in the opening direction may be accomplished without axial movement of the valve stem due to the usual back-lash in the stem threads and, due to the large number of perforations 24 in the handwheel, only a very slight rotation of the handwheel will be necessary. Upon insertion of the shackle 48 of the padlock through the co-mating perforations the valve will be locked in the closed position and unauthorized rotation of the handwheel to open the valve will be prevented.

When it is desired to open the valve the padlock 50 may be removed and the handwheel rotated without interference from the locking device. The handwheel 20, in the full open position, will be at its greatest distance from the casing 10. If it is desired to lock the valve in this position the annular member 26 may be moved axially from its seat on the casing until the deflected portion 44 assumes proximate relation with the underside of the handwheel 20 sufficient to permit the insertion of the shackle 48 of the padlock 50 through the perforations 46 and 24, as described in connection with the operation of the device in closed position of the valve.

From the foregoing it will be apparent that a simple and economical means has been provided for locking a valve of the rising stem type in either open or closed position, or any position intermediate thereof.

We claim:

1. A locking device for valves provided with a valve casing having a separable polygonal portion and a projecting stem rotatable by a perforated handwheel for opening and closing said valve, comprising an annular member having a polygonal bore slidably but non-rotatably engaging the polygonal portion of said casing, a depending portion on said annular member adapted to engage the casing and prevent separation of the polygonal portion therefrom, a projection on said member adapted to assume a proximate relation with the handwheel when the valve is in open or closed position, and means on said projection having a perforation co-mating with a perforation on the handwheel through which a locking element may project.

2. A locking device for valves provided with a casing having a polygonal bonnet part and a projecting stem axially movable by rotation of a perforated handwheel into valve opening and closing positions, comprising means for preventing rotation of said handwheel and including an annular member having a polygonal bore slidably engaging the polygonal bonnet part and being seated on the casing, a lug on said member adapted to engage the casing and prevent removal of the bonnet therefrom, an arm projecting from said annular member beyond said bonnet into proximate relation with the underside of the handwheel when the valve is in closed position, said annular member being slidable axially on said polygonal bonnet part to maintain said relation between the arm and the handwheel when the valve is in open position, and means on said arm having a perforation co-mating with a perforation on the handwheel through which a locking element may project.

3. A locking device for valves provided with a casing having a bonnet provided with a polygonal base threadedly engaging said casing and a stem projecting through said bonnet and having a perforated handwheel thereon for axially moving said stem upon rotation thereof to open and close said valve, comprising means for preventing rotation of the handwheel and including an annular member having a polygonal bore slidably engaging the polygonal base and being seated on the casing, a lug depending from said member and adapted to engage the casing to prevent unthreading of the base therefrom, an arm projecting from said annular member beyond said bonnet into proximate relation with the underside of the handwheel when the valve is in closed position, said annular member being slidable axially on said base to maintain said relation when the valve is in open position, and a deflected portion on said arm extending substantially parallel with the underside of the handwheel, said portion having a transverse opening therein co-mating with a perforation in the handwheel through which a locking element may extend.

4. A locking device for valves provided with a casing having a bonnet provided with a polygonal base threadedly engaging said casing, a stem projecting through said bonnet and having a handwheel thereon provided with a plurality of annularly spaced perforations, said handwheel being rotatable with said stem for axially moving said stem to open and close said valve, and a packing gland adjustable on the bonnet, comprising means for preventing rotation of the handwheel and including an annular member having a polygonal bore slidably engaging the polygonal base and being seated upon the casing, a lug depending from one side of said member and adapted to engage the casing to prevent unthreading of the base therefrom, an arm projecting from the side of said annular member opposite said lug and deflected inwardly toward the stem into overlying relationship with the packing gland, said arm extending beyond said gland into proximate relation with the underside of said handwheel when the valve is in closed position, said annular member being slidable axially on said base to maintain said relation when the valve is in open position, and a deflected portion on said arm extending susbtantially parallel with the underside of the handwheel, said portion having a transverse opening therein co-mating with one of the perforations in the handwheel through which a locking element may extend.

5. A locking device for valves provided with a casing having a removable portion in threaded engagement therewith and a stem rotatable by a handwheel for opening and closing said valve, comprising an annular member slidably but non-rotatably engaging said removable portion, abutment means associated with said member and casing to prevent disengagement of said removable portion, and a projection on said member movable bodily therewith into proximate relation with the handwheel whereby the latter may be locked against rotation.

FRANK E. LOUGHNER.
FRENCH H. MOREHEAD.